(12) United States Patent
McGovern

(10) Patent No.: US 12,538,900 B2
(45) Date of Patent: Feb. 3, 2026

(54) REMOTE RELEASE LEASH AND METHOD

(71) Applicant: Edmund Charles McGovern, Wilmington, DE (US)

(72) Inventor: Edmund Charles McGovern, Wilmington, DE (US)

( * ) Notice: Subject to any disclaimer, the term of this patent is extended or adjusted under 35 U.S.C. 154(b) by 0 days.

(21) Appl. No.: 18/939,667

(22) Filed: Nov. 7, 2024

(65) Prior Publication Data

US 2025/0160302 A1 May 22, 2025

Related U.S. Application Data

(60) Provisional application No. 63/600,647, filed on Nov. 18, 2023.

(51) Int. Cl.
*A01K 27/00* (2006.01)

(52) U.S. Cl.
CPC .................. *A01K 27/003* (2013.01)

(58) Field of Classification Search
CPC ............... A01K 27/003; A01K 27/05
See application file for complete search history.

(56) References Cited

U.S. PATENT DOCUMENTS

| | | | | |
|---|---|---|---|---|
| 579,113 | A * | 3/1897 | Lally | A01K 27/005 |
| | | | | 119/776 |
| 4,530,310 | A * | 7/1985 | Clarke | A01K 27/005 |
| | | | | 463/47.4 |
| 4,903,638 | A * | 2/1990 | Lacey | F16B 45/021 |
| | | | | 119/776 |
| 6,230,663 | B1 * | 5/2001 | Welch | A01K 27/005 |
| | | | | 119/776 |
| 7,367,287 | B1 * | 5/2008 | Jones, Jr. | A01K 27/005 |
| | | | | 119/798 |
| 2008/0223308 | A1 | 9/2008 | Stern | |
| 2012/0199081 | A1 | 8/2012 | Daye | |
| 2015/0373951 | A1 | 12/2015 | Kelly et al. | |
| 2016/0135430 | A1 | 5/2016 | Noonan | |
| 2016/0249589 | A1 * | 9/2016 | Soto | A01K 27/004 |
| | | | | 119/794 |
| 2019/0147677 | A1 | 5/2019 | Rutledge | |
| 2020/0359604 | A1 * | 11/2020 | Soto | A01K 27/001 |

FOREIGN PATENT DOCUMENTS

| | | |
|---|---|---|
| AU | 2004100257 A4 | 4/2004 |
| DE | 202023101406 U1 | 5/2023 |
| ES | 1292374 U | 6/2022 |
| WO | 2012042205 A1 | 4/2012 |
| WO | 2023131730 A2 | 7/2023 |

* cited by examiner

*Primary Examiner* — Kristen C Hayes
(74) *Attorney, Agent, or Firm* — Barley Snyder

(57) ABSTRACT

A remote release leash includes a leash body having a proximal end and a distal end opposite to the proximal end, a connector disposed at the distal end of the leash body, and a release assembly extending along the leash body and mechanically connected to the connector. The release assembly has a toggle. The toggle is actuatable to move the connector from a closed state in which the connector retains a clipped element to an open state in which the clipped element is released from the connector.

18 Claims, 7 Drawing Sheets

REMOTE RELEASE LEASH AND METHOD

CROSS-REFERENCE TO RELATED APPLICATION

This application claims priority under 35 U.S.C. § 119 to U.S. Provisional Patent Application No. 63/600,647, filed on Nov. 18, 2023.

FIELD OF THE INVENTION

The present invention relates to a leash and, more particularly, to a leash that is remotely releasable.

BACKGROUND

In the realm of pet care and management, leashes play a crucial role. They are essential tools for controlling and guiding pets, especially during outdoor activities such as walks or training sessions. Traditional leashes typically consist of a length of cord, rope, or strap, one end of which is attached to the collar of the pet, while the other end is held by the pet owner.

The attachment of the leash to the pet's collar is usually facilitated by a clip or hook mechanism. This mechanism requires the pet owner to manually engage and disengage the clip or hook from the collar's D-ring. While this design is generally effective, it can pose certain challenges and inconveniences. For instance, if the pet is overly excited, muddy, or pulling on the leash, it can be difficult for the owner to unclip the leash without coming into contact with the pet or the collar. This can be particularly problematic for individuals with physical limitations, such as a bad back, who may find it difficult to bend over to reach the collar. Furthermore, the manual unclipping process can be time-consuming and inconvenient, especially in situations where quick release of the leash is desirable.

Existing solutions in the market, such as quick-release leashes, often rely on the tension in the leash to function. This means they may not work effectively when the leash is slack, for example, when the pet is seated or resting. Therefore, there is a need for a more versatile and user-friendly leash design that can overcome these limitations.

SUMMARY

A remote release leash includes a leash body having a proximal end and a distal end opposite to the proximal end, a connector disposed at the distal end of the leash body, and a release assembly extending along the leash body and mechanically connected to the connector. The release assembly has a toggle. The toggle is actuatable to move the connector from a closed state in which the connector retains a clipped element to an open state in which the clipped element is released from the connector.

BRIEF DESCRIPTION OF THE DRAWINGS

The invention will now be described by way of example with reference to the accompanying Figures, of which.

DESCRIPTION OF THE EMBODIMENTS

Figure 1:
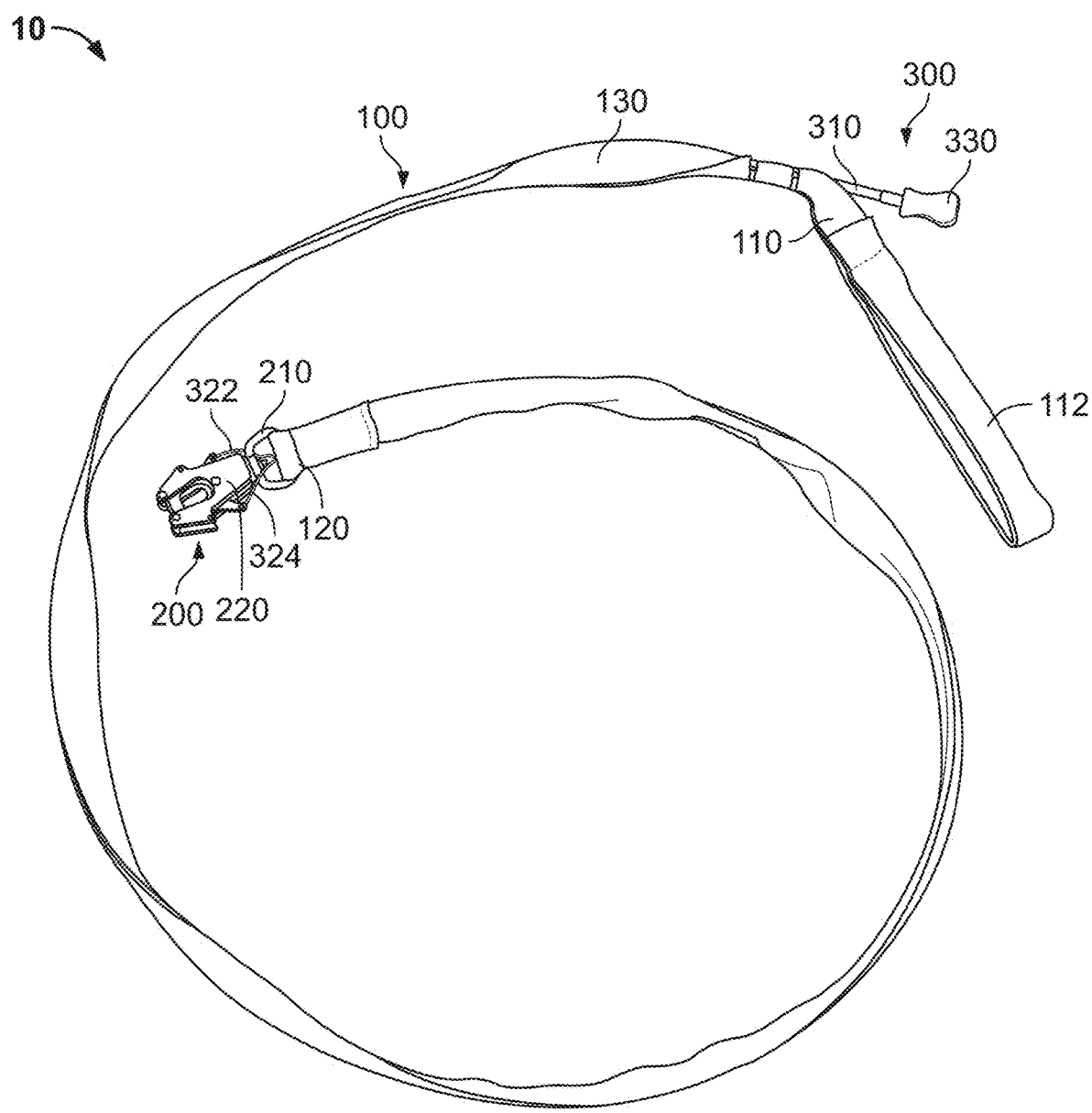
FIG. 1 is a top view of a remote release leash according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth to provide a thorough understanding of the disclosed embodiments. However, it is apparent that one or more embodiments may also be implemented without these specific details.

Throughout the drawings, only one of a plurality of identical elements may be labeled in a figure for clarity of the drawings, but the detailed description of the element herein applies equally to each of the identically appearing elements in the figure. Any directional descriptors used in the specification are merely for clarity of the description and for differentiation of the various directions. These directional descriptors do not imply or require any particular orientation of the disclosed elements.

A remote release leash 10 according to an embodiment is shown in FIG. 1. The remote release leash 10 includes a leash body 100, a connector 200 disposed on an end of the leash body 100, and a release assembly 300 extending along the leash body 100 and connected to the connector 200.

Figure 2:
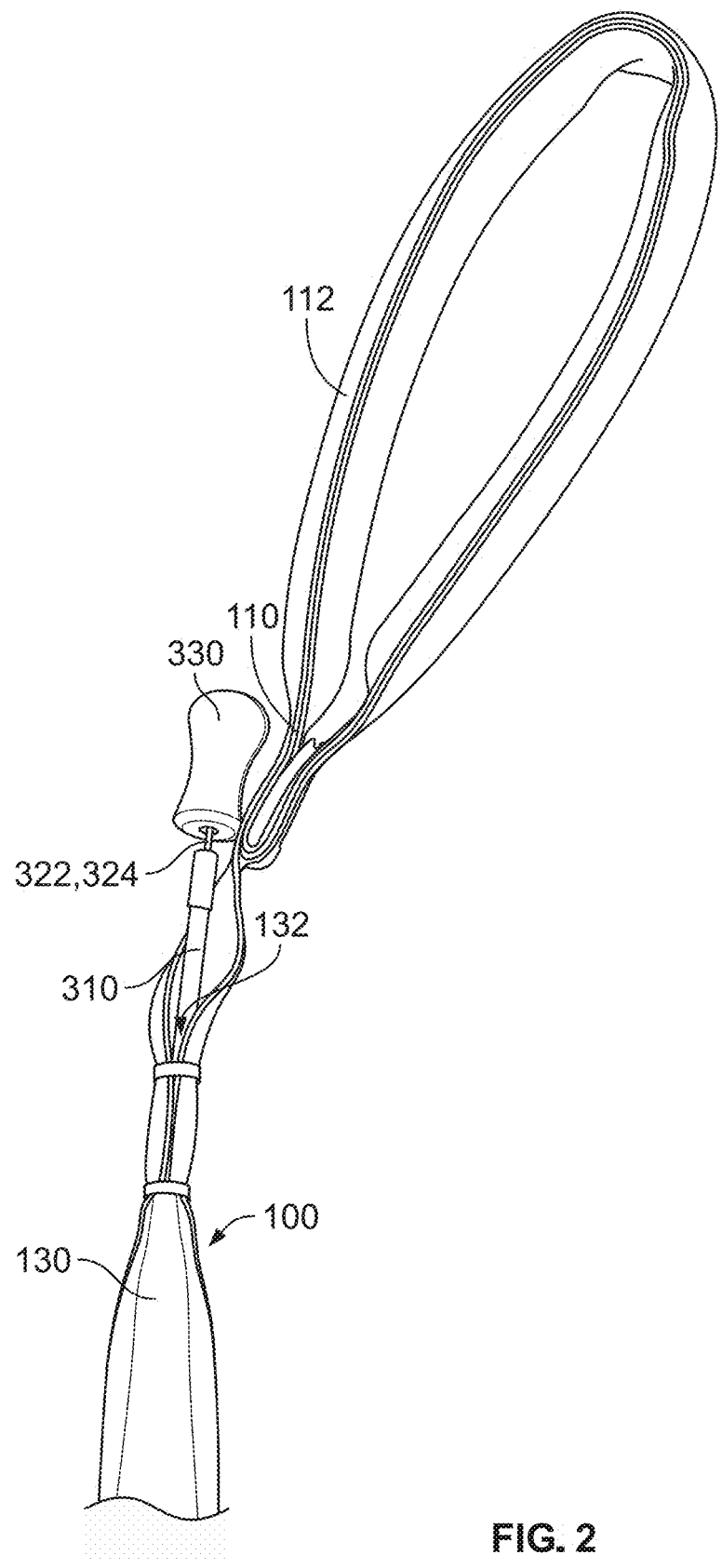
FIG. 2 is a detail top view of a proximal end of a leash body and a portion of a release assembly of the remote release leash.

The leash body 100, as shown in FIG. 1, extends from a proximal end 110 to a distal end 120 opposite the proximal end 120. The leash body 100 is a flexible material, such as a nylon webbing. In other embodiments, the leash body 100 could be formed of any other flexible material that can be used for pet leashes. In the shown embodiment, the leash body 100 has a tubular structure 130 formed of the flexible material that defines a tubular passageway 132 inside the tubular structure 130, as shown in FIG. 2; in the shown embodiment, the tubular structure 130 is a nylon tubular webbing. In other embodiments, the leash body 100 does not have the tubular structure 130 and instead is a single piece of material extending from the proximal end 110 to the distal end 120.

In the embodiment shown in FIGS. 1 and 2, the leash body 100 has a handle 112 at the proximal end 110. The handle 112, in the shown embodiment, is formed of a portion of the tubular structure 130 that folded over and attached to itself, for example by stitching, to form a loop. In other embodiments, the handle 112 could be a separate piece attached to the proximal end 110 of the leash body 100, could be integral to the flexible material of the leash body 100, or could be any other type of handle 112 used in pet leashes.

The connector 200, as shown in FIGS. 1 and 4-7, has an attachment ring 210, a frame 220 connected to the attachment ring 210 by a pivot fastener 230, and a pair of arms 242, 244 disposed within the frame 220.

Figure 4:
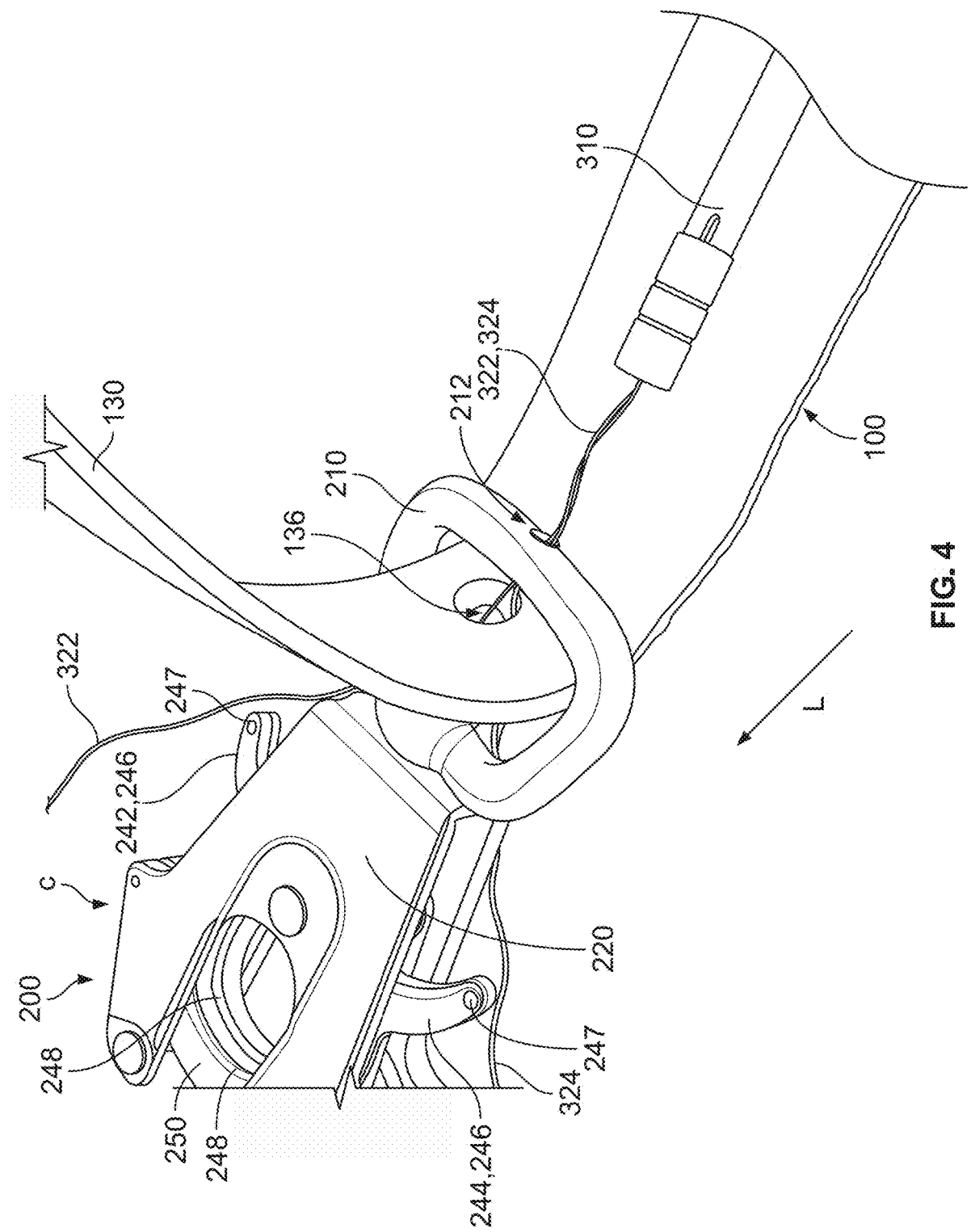
FIG. 4 is a detail perspective view of the distal end of the leash body, the another portion of the release assembly, and a connector of the remote release leash in an assembly step.

The attachment ring 210, in the embodiment shown in FIGS. 1 and 4-7, is an approximately D-shaped or trapezoidal element with rounded corners. As shown in FIG. 4, the attachment ring 210 has a connector wire passage 212 extending through a side of the attachment ring 210 in a longitudinal direction L of the remote release leash 10.

Figure 5:
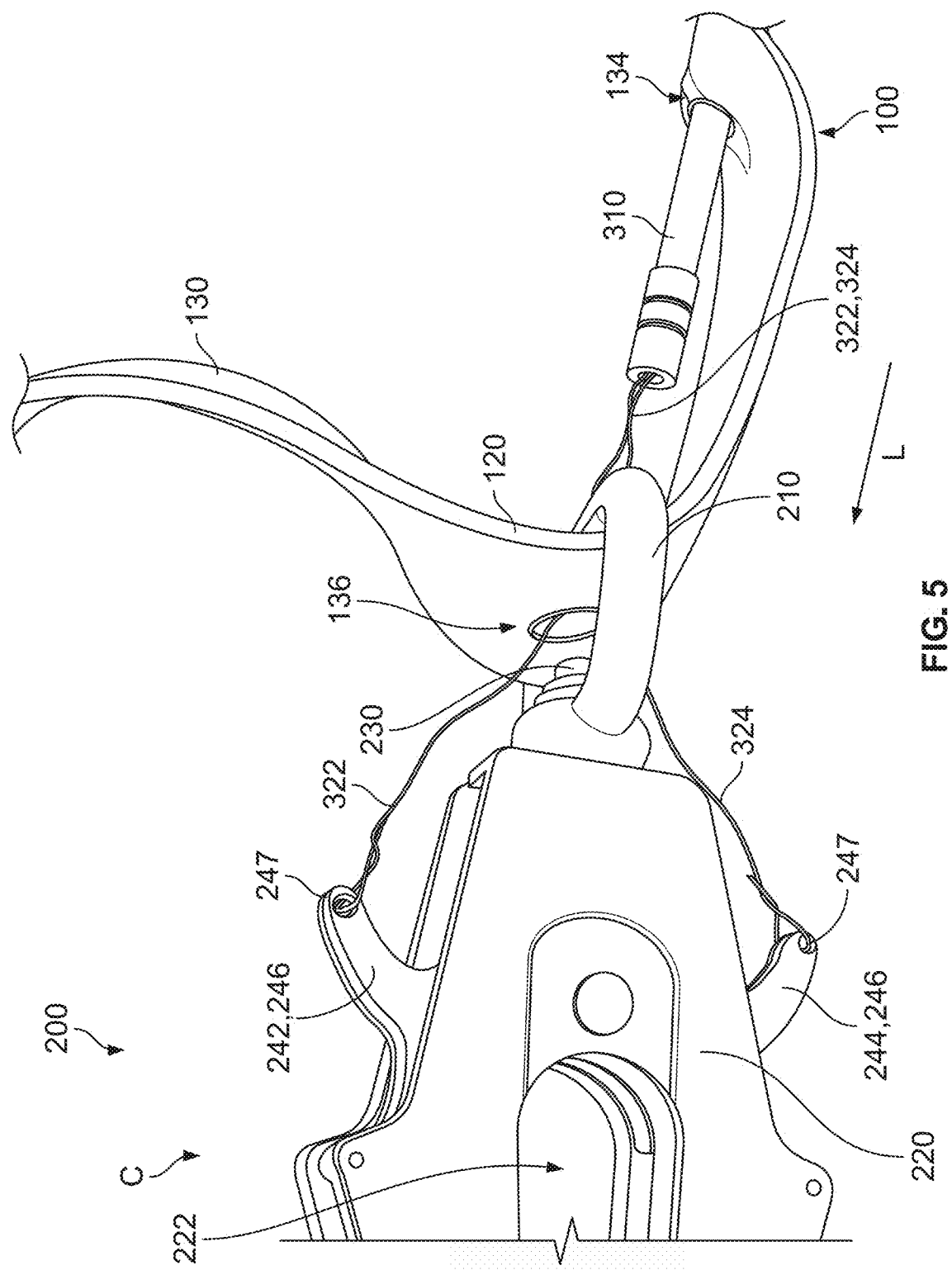
FIG. 5 is a detail perspective view of the distal end of the leash body, the another portion of the release assembly, and the connector in another assembly step.

At another side of the attachment ring 210 opposite the side having the connector wire passage 212, as shown in FIG. 5, the pivot fastener 230 extends through the attachment ring 210 and connects the attachment ring 210 to the frame 220. The pivot fastener 230 may be a bolt or any other type of fastener that secures the attachment ring 210 to the frame 220 while permitting rotation of the attachment ring 210 with respect to the frame 220 about the longitudinal direction L and around the pivot fastener 230.

Figure 7:
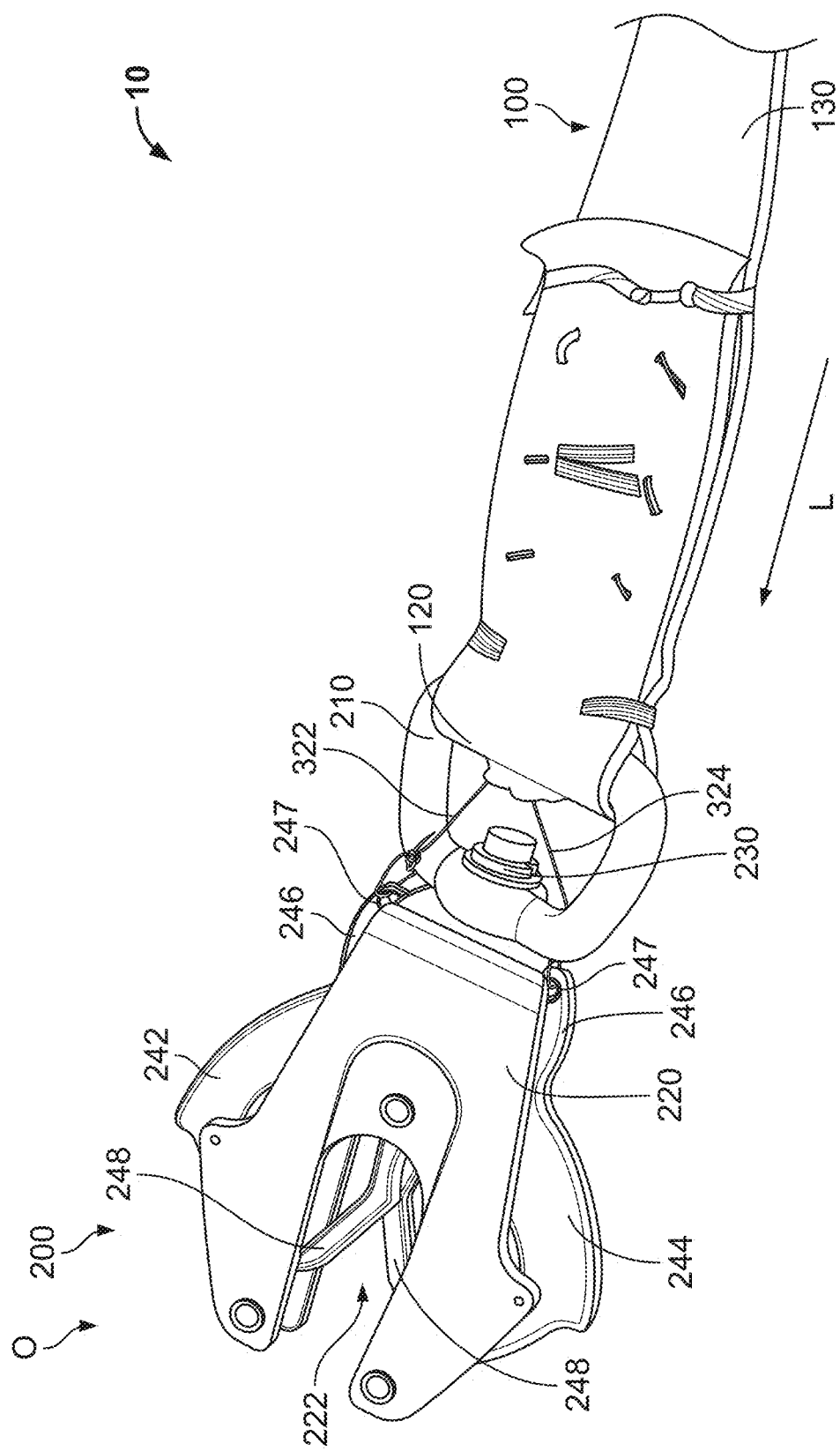
FIG. 7 is a perspective view of the end of the remote release leash in the fully assembled state with the connector in an open state.

As shown in FIGS. 5 and 7, the frame 220 has a slot 222 extending into an end of the frame 220. The slot 222 extends into an end of the frame 220 opposite the pivot fastener 230 in the longitudinal direction L.

Figure 6:
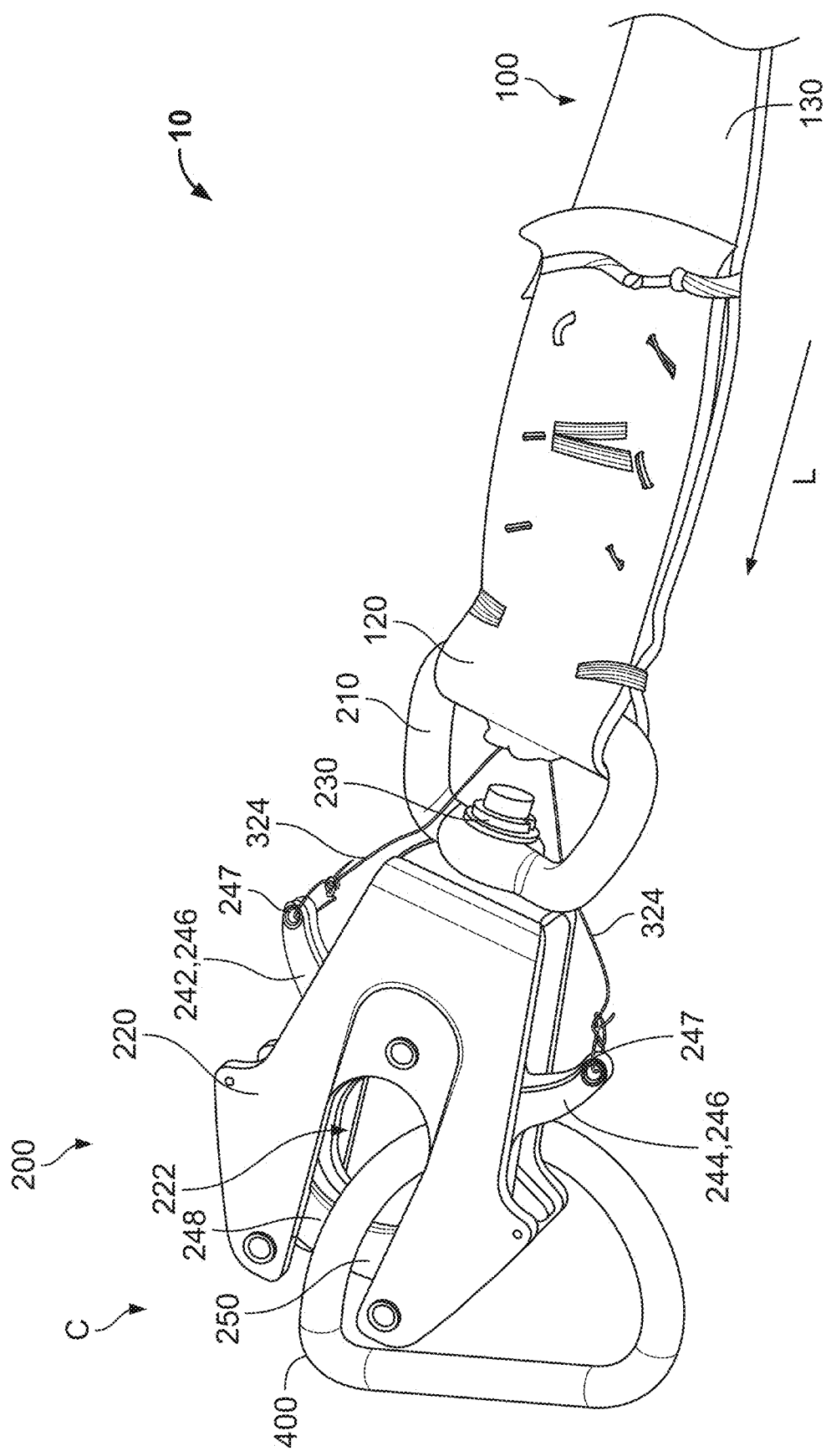
FIG. 6 is a perspective view of an end of the remote release leash in a fully assembled state with the connector in a closed state to retain a clipped element.

The pair of arms 242, 244 are positioned within the frame 220 as shown in FIGS. 6 and 7. The arms 242, 244 are movable with respect to the frame 220 between a closed state C, shown in FIG. 6, and an open state O, shown in FIG. 7. The arms 242, 244 include a first arm 242 and a second arm 244 that are identical to one another and positioned overlapping one another and facing in opposite directions within the frame 220.

Each of the arms 242, 244 has a first portion 246 and a second portion 248 at an end opposite the first portion 246, as shown in FIGS. 6 and 7. The first portion 246 of each of the arms 242, 244 remains outside of the frame 220 in the open state O and in the closed state C. The first portion 246 has an attachment point 247; in the shown embodiment, the attachment point 247 is an attachment passageway extending through the first portion 246. The second portion 248 of each of the arms 242, 244 is movable in the slot 222 between the closed state C and the open state O.

The connector 200 is formed from a rigid, durable material, such as a metal material. In the shown embodiment, the connector 200 is a frog clip or a frog connector. In other embodiments, the connector 200 can be any type of clip or connector that is capable of interacting with the leash body 100 and the release assembly 300 in the manner described herein.

The release assembly 300, as shown in FIG. 1, includes a conduit 310, a pair of wires 322, 324 extending through the conduit 310, and a toggle 330 attached to an end of the pair of wires 322, 324.

Figure 3:
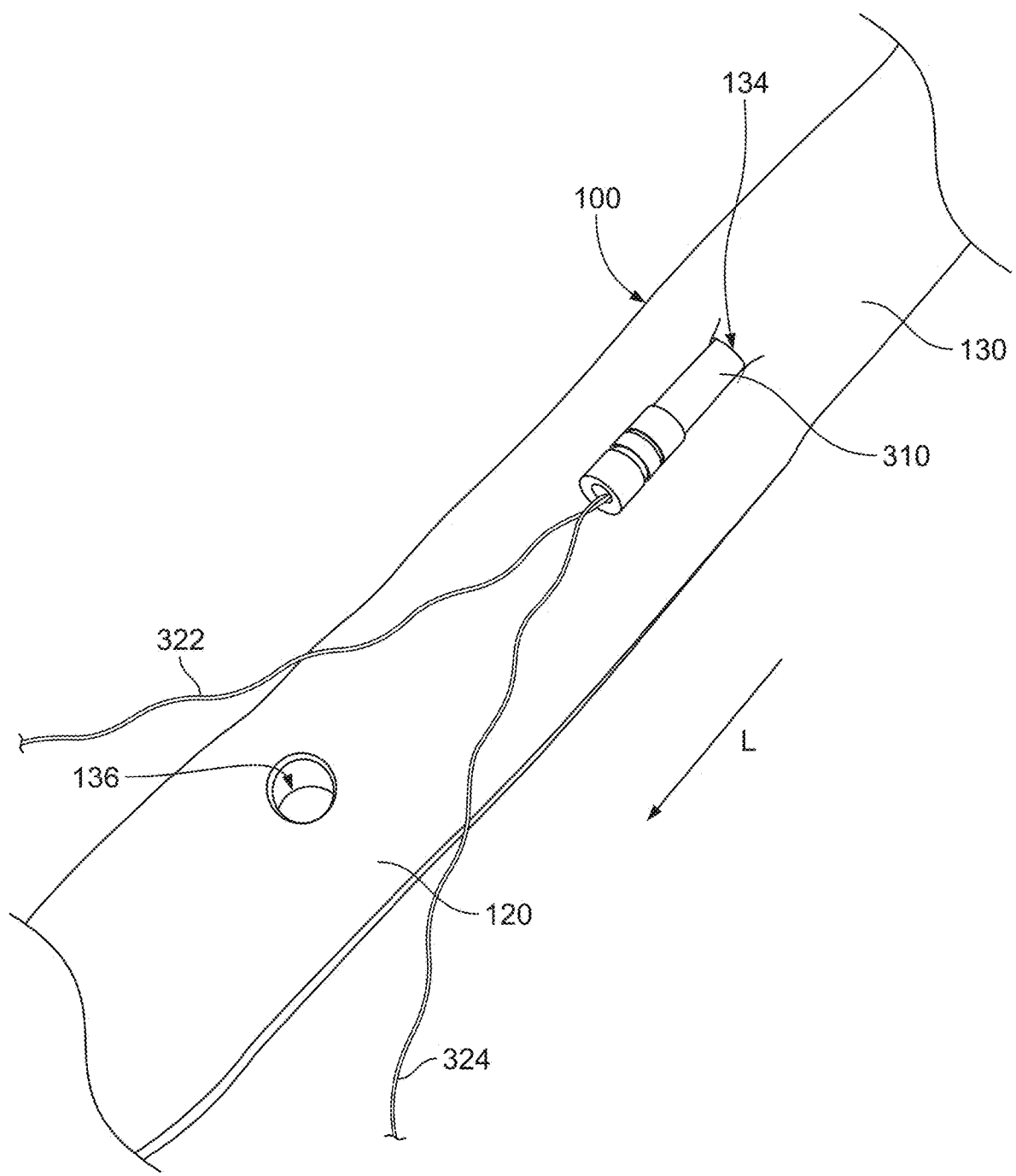
FIG. 3 is a detail perspective view of a distal end of the leash body and another portion of the release assembly.

The conduit 310, as shown in detail in FIGS. 2 and 3, is a rigid and flexible elongated member that defines an internal space along its length. In an embodiment, the conduit 310 is a steel-reinforced cable housing.

The pair of wires 322, 324 extend through the internal space of the conduit 310, as shown in FIGS. 2 and 3. In the shown embodiment, the wires 322, 324 are each thin metal wires. In other embodiments, the wires 322, 324 may be any thin, elongated materials that are durable and can serve the function of the wires 322, 324 described in detail below.

As shown in FIG. 2, the toggle 330 is attached to an end of the pair of wires 322, 324 and is positioned at an end of the conduit 310. In the shown embodiment, the toggle 330 is a knob. In other embodiments, the toggle 330 may be any element that can be grasped by a user and/or used to manipulate the positions of the wires 322, 324 to which the toggle 330 is connected.

The assembly of the remote release leash 10 will now be described in greater detail below.

As shown in FIGS. 2 and 3, the conduit 310 of the release assembly 300 is positioned within the tubular passageway 132 of the leash body 100. The conduit 310, with the wires 322, 324 in the conduit 310, extends along and in the leash body 100 from the proximal end 110 to the distal end 120. In another embodiment, the conduit 310 could extend along an outside of the leash body 100 from the proximal end 110 to the distal end 120, particularly in embodiments in which the leash body 100 is not a tubular structure 130 with a tubular passageway 132. The term "along" in the present specification, as it relates to the position of the release assembly 300 with respect to the leash body 100, is intended to refer to all embodiments of the release assembly 300 extending along a length of the leash body 100, whether the release assembly 300 is positioned on an outside of the leash body 100 or positioned on an inside of the leash body 100.

As shown in FIG. 2, with the release assembly 300 in position along the leash body 100, the toggle 330 is disposed adjacent to the proximal end 110 of the leash body 100. Throughout the present specification, the term "adjacent" means that the toggle 330 or other element described as "adjacent" herein is positioned within a distance along a length of the leash body 100 that is less than or equal to 25% of a total length of the leash body 100 from the proximal end 110 to the distal end 120. In other embodiments, the toggle 330 could be positioned anywhere along the leash body 100 between the proximal end 110 and the distal end 120.

In the embodiment shown in FIG. 2, the conduit 310 protrudes from the tubular passageway 132 at the proximal end 110 of the leash body 100 such that the toggle 330 is positioned outside the leash body 100. As shown in FIG. 3, adjacent to the distal end 120, the leash body 100 has a conduit passageway 134 extending from inside the tubular structure 130 to outside the leash body 100. The conduit 310 exits the tubular structure 130 through the conduit passageway 134. In the embodiment of FIGS. 1-3, greater than 75%, and in an embodiment greater than 90%, of a length of the conduit 310 is positioned within the tubular structure 130.

When the release assembly 300 is positioned with respect to the leash body 100 as described above, the wires 322, 324 extend out an end of the conduit 310 and are positioned outside the leash body 100 as shown in FIG. 3. The leash body 100 has a leash wire passageway 136 extending through the leash body 100 at the distal end 120.

To attach the connector 200 to the leash body 100 and the release assembly 300, as shown in FIG. 4, the leash body 100 is positioned to extend through the attachment ring 210 with the leash wire passageway 136 aligned with the connector wire passage 212 along the longitudinal direction L. The wires 322, 324 are positioned to extend through the connector wire passage 212 and through the leash wire passageway 136, as shown in FIG. 4.

As shown in FIG. 5, each of the wires 322, 324 is connected to the first portion 246 of one of the arms 242, 244 of the connector 200. The first wire 322 is connected to the attachment point 247 of the first arm 242 and the second wire 324 is connected to the attachment point 247 of the second arm 244. As described in greater detail below, with the wires 322, 324 attached to the attachment points 247, movement of the wires 322, 324 imparts movement to one of the respective arms 242, 244 to which the wire 322, 324 is attached. The wires 322, 324 each extend from a first end connected to the toggle 330, through and/or along the leash body 100, to a second end connected to one of the arms 242, 244 of the connector 200. The release assembly 300 extends along the leash body 100 and is mechanically connected to the connector 200.

As shown in FIGS. 6 and 7, the portion of the leash body 100 extending through the attachment ring 210 is folded back over the end of the conduit 310 and attached to itself, for example by stitching. The attachment ring 210 is fixed to the distal end 120 of the leash body 100, positioning the connector 200 at the distal end 120 of the leash body 100. The conduit 310 extends from the toggle 330 to the distal end 120 of the leash body 100. The remote release leash 10 is shown fully assembled in FIGS. 1, 6, and 7.

The remote release leash 10 is shown attached to a clipped element 400 in FIG. 6. The clipped element 400 is shown schematically in FIG. 6 and can be any type of element that the connector 200 can releasably attach to. In the applications of the remote release leash 10 for pet restraint, the clipped element 400 can be a D-ring on a pet collar, can be another portion of the pet collar, can be a portion of a pet harness, or can be any portion of any type of animal restraint to which a leash or lead can be connected.

In FIG. 6, the connector 200 is in a closed state C in which the clipped element 400 is positioned in the slot 222 and retained in the connector 200. In the closed state C, the second portions 248 of each of the arms 242, 244 are positioned in the slot 222 and together form a barrier 250 enclosing the slot 222. The clipped element 400 cannot be removed from the connector 200 unless both arms 242, 244 are pivoted from the closed state C to the open state O as described in greater detail below; if only one of the arms 242, 244 is pivoted out of the closed state C, the other of the arms 242, 244 will continue to form the barrier 250 preventing release of the clipped element 400.

The connector 200 is in the closed state C with the clipped element 400 retained in the connector 200 when, for example, a user is walking or training a pet and holding the remote release leash 10 at the handle 112. When a user desires to release the clipping of the connector 200 to the clipped element 400, to disconnect the remote release leash 10 from the pet, the user can control movement of the clipped element 400 from the closed state C to the open state O remotely; from the proximal end 110 of the leash body 100.

To move the connector 200 from the closed state C to the open state O, the user actuates the toggle 330 adjacent to the proximal end 110 of the leash body 100 by, for example, pulling on the toggle 330. The actuation of the toggle 330 pulls the wires 322, 324 of the release assembly 300, which pull the first portions 246 of the arms 242, 244 and rotate the arms 242, 244 from the closed state C shown in FIG. 6 to the open state O shown in FIG. 7. Actuation of the toggle 330 moves the connector 200 from the closed state C to the open state O via the wires 322, 324; each of the wires 242, 244 moves one of the arms 242, 244 from the closed state C to the open state O.

Although the toggle 330 is described with respect to the shown embodiment as pulling the arms 242, 244 from the closed state C to the open state O, other manipulations of the toggle 330 and movements of the wires 322, 324 are possible to transition the arms 242, 244 and the connector 200 from the closed state C to the open state O, provided that the release assembly 300 is mechanically connected to the connector 200 and actuation of the toggle 330 mechanically changes the state of the connector 200.

In the open state O, the second portions 248 of the arms 242, 244 are rotated with respect to the frame 220 and move out of the slot 222, removing the barrier 250 from the slot 222. In the open state O, the slot 222 is open at the end of the frame 220 to permit release and removal of the clipped element 400 from the connector 200.

Using the remote release leash 10, the user can move the connector 200 from the closed state C to the open state O, releasing the pet from the leash body 100, by manipulating the toggle 330 at the proximal end 110 of the leash body 100. The user thus does not need to bend or stoop to the level of the clipped element 400 to reach and release the clipped element 400, significantly improving ease of use for those with physical limitations. The remote release leach 10 also provides a faster and more easily manipulated release of the clipped element 400, improving convenience and time efficiency for all users. Further, the remote release leash 10 permits controlled movement of the connector 200 from the closed state C to the open state O independent of the tension in the leash body 100; the remote release leash 10 will function as described above whether the leash body 100 is under tension or slack.

The connector 200 is stable in both the open state O and the closed state C. In the closed state C, the arms 242, 244 are biased toward and tend to remain in the closed state C until actuated to the open state O via the toggle 330 as described above. In the open state O, the arms 242, 244 are biased toward and tend to remain in the open state O. The connector 200 can be moved from the open state O shown in FIG. 7 to the closed state C shown in FIG. 6 by, for example, inserting the clipped element 400 into the slot 222 and into contact with the second portions 248 of the arms 242, 244, which pivots the arms 242, 244 back to the closed state C.

What is claimed is:

1. A remote release leash, comprising:
   a leash body having a proximal end and a distal end opposite to the proximal end;
   a connector disposed at the distal end of the leash body, and
   a release assembly extending along the leash body and mechanically connected to the connector, the release assembly has a toggle actuatable to move the connector from a closed state in which the connector retains a clipped element to an open state in which the clipped element is released from the connector, the release assembly has a pair of wires extending from the toggle to the connector, actuation of the toggle moves the connector from the closed state to the open state via the wires, the connector has a frame and a pair of arms that are movable with respect to the frame between the closed state and the open state, each of the wires is connected to one of the arms and moves one of the arms from the closed state to the open state on actuation of the toggle.

2. The remote release leash of claim 1, wherein the leash body has a handle at the proximal end.

3. The remote release leash of claim 1, wherein the leash body has a tubular structure formed of a flexible material.

4. The remote release leash of claim 3, wherein the release assembly is positioned at least in part within the tubular structure.

5. The remote release leash of claim 1, wherein the release assembly has a conduit extending from the toggle to the distal end of the leash body, the wires are positioned within the conduit.

6. The remote release leash of claim 1, wherein the frame has a slot, each of the arms has a first portion connected to one of the wires and a second portion that is movable in the slot from the closed state to the open state.

7. The remote release leash of claim 6, wherein the second portion of each of the arms forms a barrier enclosing the slot in the closed state.

8. The remote release leash of claim 6, wherein the connector moves from the open state to the closed state when the second portions of the arms contact the clipped element inserted into the slot.

9. The remote release leash of claim 1, wherein the connector has an attachment ring fixed to the distal end of the leash body, the frame is rotatably connected to the attachment ring.

10. The remote release leash of claim 9, wherein the wires extend through a connector wire passage in the attachment ring.

11. The remote release leash of claim 10, wherein the wires extend through a leash wire passageway in the leash body.

12. The remote release leash of claim 1, wherein the connector is stable in both the open state and the closed state.

13. The remote release leash of claim 1, wherein the toggle is pulled to move the connector from the closed state to the open state.

14. A method of remotely releasing a leash, comprising:
providing a remote release leash including a leash body having a proximal end and a distal end opposite to the proximal end, a connector disposed on the distal end of the leash body, and a release assembly extending along the leash body and mechanically connected to the connector, the release assembly has a toggle and a pair of wires extending from the toggle to the connector; and
actuating the toggle to move the connector from a closed state in which the connector retains a clipped element to an open state in which the clipped element is released from the connector, actuation of the toggle moves the connector from the closed state to the open state via the wires, the connector has a frame and a pair of arms that are movable with respect to the frame between the closed state and the open state, each of the wires is connected to one of the arms and moves one of the arms from the closed state to the open state on actuation of the toggle.

15. The method of claim 14, wherein the toggle is pulled to move the connector from the closed state to the open state.

16. The method of claim 14, wherein the connector is moved from the open state to the closed state by inserting the clipped element into the connector.

17. The method of claim 14, wherein the toggle is actuatable to move the connector from the closed state to the open state whether the leash body is in tension or slack.

18. A remote release leash, comprising:
a leash body having a proximal end and a distal end opposite to the proximal end;
a connector disposed at the distal end of the leash body; and
a release assembly extending along the leash body and mechanically connected to the connector, the release assembly has a toggle actuatable to move the connector from a closed state in which the connector retains a clipped element to an open state in which the clipped element is released from the connector, the release assembly has a wire extending from the toggle to the connector, actuation of the toggle moves the connector from the closed state to the open state via the wire, the release assembly has a conduit extending from the toggle to the distal end of the leash body, the wire is positioned within the conduit.

* * * * *